United States Patent Office

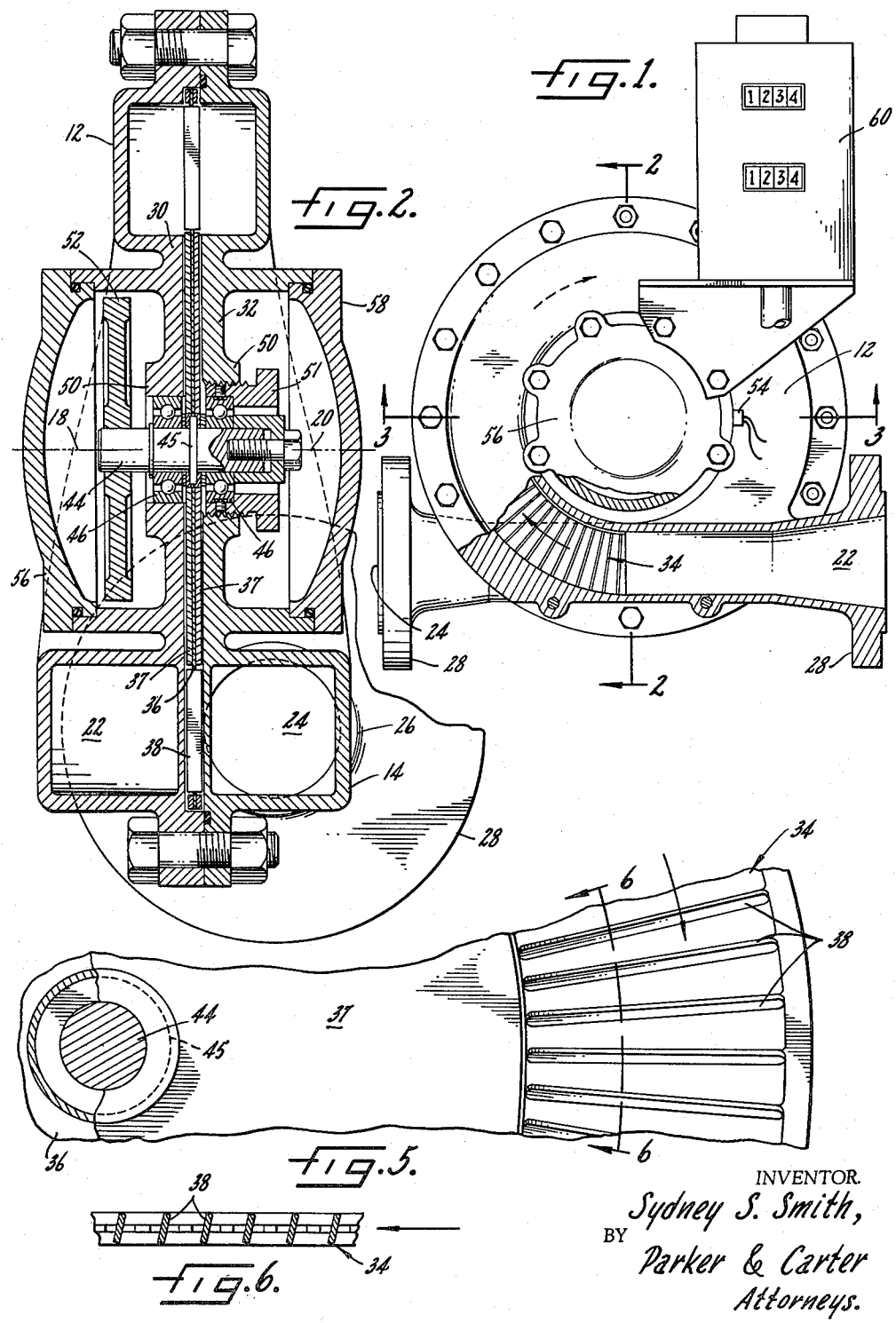

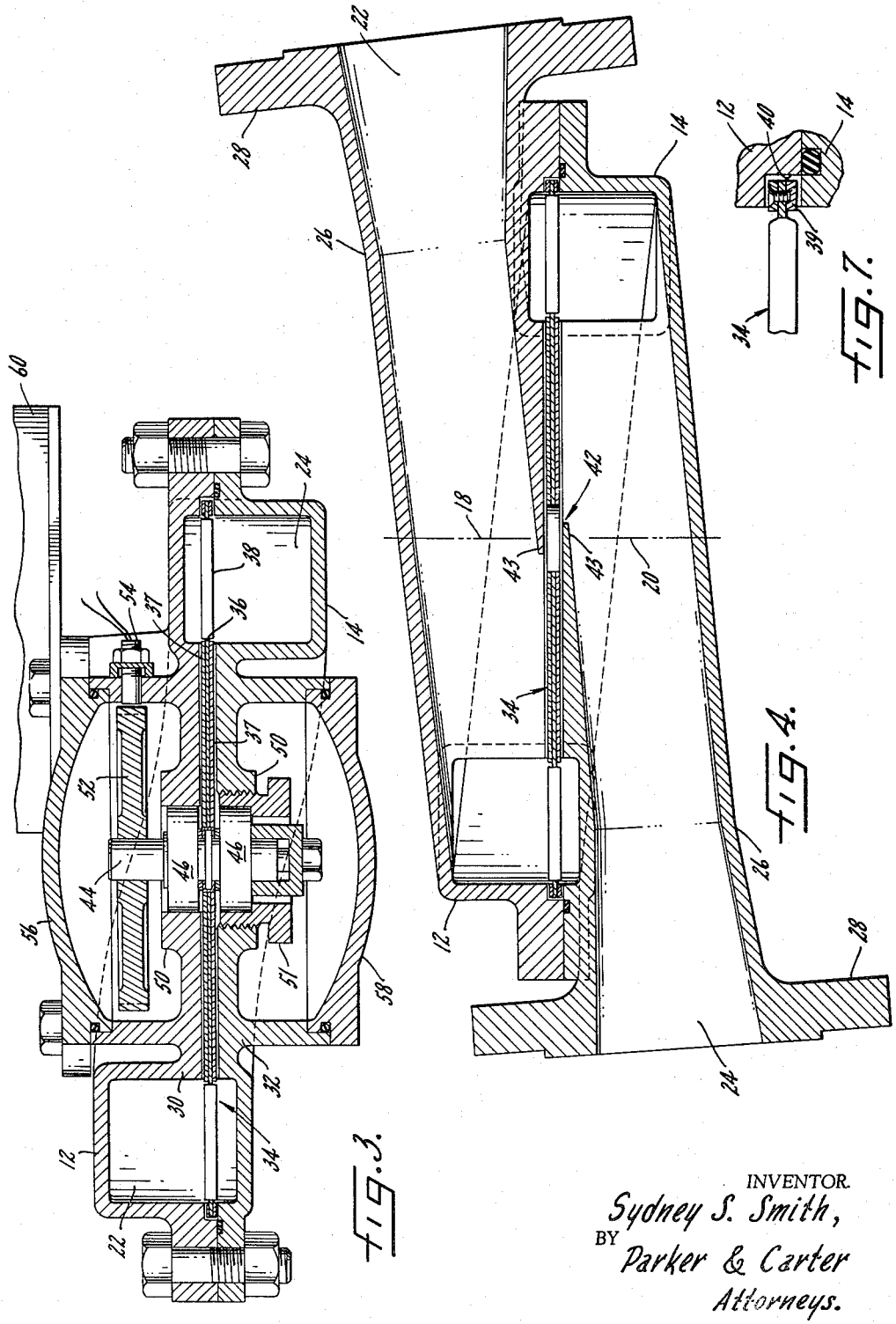

3,174,337
Patented Mar. 23, 1965

3,174,337
TURBINE METER
Sydney S. Smith, Scarsdale, N.Y., assignor to Smith Development Co., Pebble Beach, Calif., a corporation of California
Filed Sept. 5, 1962, Ser. No. 221,488
11 Claims. (Cl. 73—229)

This invention relates to fluid flow meters of the turbine wheel type, and is a continuation in part of my co-pending application, Serial No. 142,277, filed October 2, 1961, now abandoned.

A primary purpose of this invention is a fluid flow meter using a turbine wheel which is accurately responsive to the flow of fluid.

Another purpose is a flow meter of the type described which has minimum recycling of fluid from the outlet back to the inlet.

Another purpose is a flow meter of the type described in which the rotor blades are in contact with the fluid through substantially their entire path of rotation.

Another purpose is a fluid flow meter having minimum flow resistance.

Another purpose is a flow meter which may be used to measure the flow of a variety of fluids.

Another purpose is a flow meter which measures velocity.

Other purposes will appear in the ensuing specification, drawings and claims.

The invention is illustrated diagrammatically in the following drawings wherein:

FIGURE 1 is a side view, in part section, of the flow meter of this invention,

FIGURE 2 is a section along plane 2—2 of FIGURE 1,

FIGURE 3 is a section along plane 3—3 of FIGURE 1,

FIGURE 4 is a diagrammatic illustration of the connection between the inlet and outlet ends of the conduit, FIGURE 5 is an enlarged side view of the rotor blades, FIGURE 6 is a section along plane 6—6 of FIGURE 5, and FIGURE 7 is an enlarged partial section illustrating the periphery of the rotor.

A conduit or flow path 10, which is preferably a helix of generally constant radius, is formed by a pair of generally circular housing sections 12 and 14, which may be identical. The sections 12 and 14 form a spiral or helical conduit which extends through approximately 360 degrees. The helical section of the conduit may start along the vertical diameter of the circle formed by the helix and generally at the bottom, as indicated at 18. The helix may end 360 degrees later, as indicated at 20 in FIGURE 2. That portion of the conduit within the helix and immediately adjacent thereto is preferably square in cross section, whereas that portion of the conduit forming the inlet 22 and the outlet 24 may be circular in cross section. In general, the square conduit may be the inscribed square of the inlet circular conduit and the fluid velocity is slightly increased. The entire conduit may be square, however it is conventional to have fluid conduits circular in cross section. There is a transformation, indicated at 26, from the circular cross section adjacent the inlet and outlet to the square cross section of the measuring portion of the meter. The transition portion of the conduit should be smooth to reduce turbulence at this point to a minimum. Both the inlet and outlet may have flanges or the like 28 for suitable connection into the fluid system. The inlet and outlet conduits are preferably parallel and direct extensions of the conduit helix. In this way there are no unnecessary bends in the flow path and turbulence will be kept to a minimum.

The conduit sections 12 and 14 may each have generally solid integral center sections 30 and 32 to form a housing or well for a turbine rotor or impeller indicated generally at 34. The rotor is coaxial with the helix axis and moves in a plane generally perpendicular to the helix axis. The rotor 34 may include a generally central wheel portion 36, which preferably is solid, and a plurality of preferably generally equally spaced blades 38 around the periphery. Reinforcing plates or support plates 37 may be fixed to opposite sides of the central wheel portion 36.

The blades 38 preferably are flat, although they may be slightly curved, and should be arranged so that their surface is somewhat normal to the flow of the fluid through the conduit. As shown in FIGURE 6, the blades preferably form an angle slightly greater than 90 degrees with the path of flow. In this way the fluid may slide through the blades with a minimum of resistance. An angle of between 6 to 12 degrees from normal is satisfactory. Because the lead of the helix may vary, in some applications the blades may be almost normal to the flow and still permit the fluid to slide through the blades.

A suitable groove or the like 40 may be formed in the inside of the conduit sections 12 and 14, for example, where they join. The outer edge of the rotor may have reinforcing rings 39 fixed thereto, with a minimum clearance between the periphery of rings 39 and inside periphery of the groove 40. The rings 39 are advantageous to prevent vibrations and misalignment of the rotor.

It should be noted that the blades rotate in a single plane within the conduit, in effect, moving across the conduit from the inlet toward the outlet. The rotor enters the conduit adjacent the inlet, about where the helix starts. Initially the blades 38 are quite close to one side of the conduit. The blades gradually move across the conduit, or the conduit moves across the blades, in a direction from the inlet toward the outlet. As seen in FIGURE 3, the blades are adjacent the opposite side of the conduit as they approach the outlet.

It should be noted that the width of the blades is substantially smaller than the width of the conduit, while the length of the blades is generally equal to the cross section of the conduit. In this way, the flow of fluid through the conduit is substantially unobstructed. The fluid may move through the entire conduit without having its flow pattern changed, but yet all of the fluid must pass through the blades. It is not necessary in a meter or measuring device of this type to have the blades substantially fill the conduit. It is only necessary that the flow of the fluid through the conduit move the measuring wheel accurately in response to the velocity of the fluid.

Adjacent the bottom of the device, although it may be the top or any other portion, where the helix begins and ends, the inside walls of the conduit may be joined together by any suitable manner, for example by welding, and aligned openings are formed in the walls of the conduit to permit the passage of the turbine blades. These aligned openings are indicated at 42 in FIGURE 4. The walls of the conduit preferably overlap, as at 43, to form a tunnel. The tunnel or channel should be substantially the same, both in size and shape, as the blades, so that there will be no backflow or recycling of fluid other than that carried by the blades themselves. There is some recycling of fluid in that the blades will have fluid between them as they move through this opening. However, the amount of fluid actually carried by the blades is minute in comparison with the flow of fluid through the conduit and it may be ignored.

The wheel 36 may be suitably rigidly mounted on a shaft or the like 44 by a drive pin 45 and may rotate between bearings 46. The shaft is freely rotatable and the bearings should be such that there is a minimum of friction. It is essential that the shaft rotate directly in response to the flow of fluid to have an accurate measurement of the velocity of the fluid. Each of the center sections 30 and 32 of the conduit sections 12 and 14 has generally outstanding circular flanges 48 and 50 which enclose the bearings 46 and the shaft 44. An adjusting nut 51 may be threaded to flange 50 for properly positioning the rotor within the conduit.

The shaft 44 may have a gear 52 mounted on one end, which passes by a magnetic pickup 54 mounted in a cover 56. A similar cover 58 may enclose the opposite side of the central section of the meter. The magnetic pickup 54 will provide a pulse every time a tooth on gear 52 passes by. In this way, the velocity of the fluid may be measured. A connector or the like 60 may be used to visually indicate the number of revolutions of the rotor or the velocity of the fluid. The invention should not be limited to any particular type of recording or measuring device as there are many devices which may be satisfactory. The meter may be calibrated directly in flow volume or in flow velocity.

The use, operation and function of the invention are as follows:

The flow meter shown may be used in measuring the rate of flow of any type of fluid, for example, water, hydraulic fluid, oil, milk, drugs, gases, etc. The flow meter is designed to be connected within a fluid system which normally carries the fluid in question and is designed to pass this fluid with a minimum of resistance.

It is important that the fluid be in contact with the blades through substantially the entire path of rotation. In this way, all of the fluid will pass through the rotor and the meter will give highly accurate readings. The only place that the rotor is actually out of contact with the fluid flowing through the conduit is at the tunnel or channel where the blades pass from the outlet conduit back to the inlet conduit. This distance is very short and, in effect, the rotor is in contact with the fluid through substantially all of its path. It is highly important that the blades traverse the cross section of the conduit and be in contact with the fluid in the conduit through substantially the full 360 degrees of the conduit. The flow in the conduit is laminar and the velocities of the flow at different points in a cross section of the conduit are not equal. By having the blades traverse the conduit and by having the blades in contact with the fluid through substantially the full 360 degrees of the conduit, a blade is exposed at all times to every velocity within the conduit and there is an integrating effect. In other words, the different velocities will be averaged because there are blades at all lateral positions throughout the full circle of the conduit. The present invention provides a meter of exceptional accuracy and it is due to the use of blades throughout the full 360 degrees of the conduit and the fact that the blades are simultaneously exposed to the different velocities within the conduit.

By keeping the width of the blades at a minimum, the flow of fluid through the conduit is largely unobstructed. The size of the blades has no bearing on the response of the rotor to the flow of fluid, providing the fluid is flowing uniformly through the conduit. The shape of the blades is important. Although generally flat blades are preferred, the blades may be curved, if desired, but in any event, the blades should be shaped so that they are substantially the same in size and shape as the tunnel or openings 42 to minimize any leakage or backflow at this point. It is desirable to form the blades at an angle greater than 90 degrees with the path of flow so that the fluid will slide through the blades. In this connection the blades may form an angle other than 90 degrees with the plane of the rotor, or the blades may be generally perpendicular to the plane of the rotor.

The two conduit sections making up the structure define a central well which contains the central portion of the rotor. The rotor practically fills the center well and the dimensions or clearance between it and the well will be determined by the viscosity of the liquid. The laminar flow area or thickness of the laminar film in liquids of up to above five centistokes kinematic viscosity is in the order of about .003 inch. Therefore the rotor may fit in the well with approximately ten-thousandths of an inch clearance on each side to minimize viscosity drag, but still provide negligible flow except through the blade area. In this way, the friction on the rotor will be reduced to an absolute minimum and yet the well and rotor will be sufficiently tight to prevent backflow through the well.

Although the structure described and claimed is primarily for use in a flow meter, it may also have application in a power generating apparatus as large amounts of torque can be made available at the output shaft.

Because the meter is symmetrical and formed from two identical halves, fluid can be run through it in either direction. The meter is reversible.

Of advantage is the fact that the meter may be formed of stainless steel and steam cleaned. This is important for the measurement of foods and drugs.

Whereas the preferred form of the invention has been shown and described herein, it should be realized that there are many modifications, substitutions and alterations thereto within the scope of the following claims.

I claim:

1. A fluid flow meter including a housing, said housing having a helical fluid conduit, a turbine rotor freely rotatable in said housing, said rotor having a plurality of blades about its periphery positioned within said fluid conduit, said conduit forming a passage for movement of said blades and having an inlet on one side of said rotor and an outlet on the opposite side, said conduit having a generally constant radius, portions of said conduit, adjacent the inlet and outlet, being joined together, with each of said joined portions having aligned openings for the passage of said rotor blades from one joined portion to the other, said aligned openings being generally the same in size and shape as said rotor blades, said blades rotating in direct response to fluid flow and entirely within the confines of said conduit, said blades moving from one side of the conduit to the other as they rotate from the inlet to the outlet, said blades being in contact with the fluid in the conduit through substantially 360 degrees, and means for measuring the velocity of said rotor.

2. The structure of claim 1 further characterized in that said conduit has a generally square cross section.

3. The structure of claim 1 further characterized in that said rotor blades are substantially smaller than the cross section of the conduit such that the flow of fluid through said conduit is largely unobstructed.

4. The structure of claim 1 further characterized by an output shaft fixed to the rotor.

5. The structure of claim 1 further characterized in that the portions of said conduit adjacent the inlet and outlet which are joined together, overlap.

6. A fluid flow meter including a housing, said housing having a helical fluid conduit extending through approximately 360 degrees, said conduit having an inlet end and an outlet end, a rotor within said housing and coaxial with the helix axis, said rotor having a plurality of blades adjacent its periphery which are positioned for rotation within said conduit, a tunnel between the inlet and outlet ends of the conduit for the passage of said rotor blades from the outlet end to the inlet end, said tunnel being generally the size and shape of said blades, said rotor being driven in response to movement of fluid through said conduit, said blades moving from one side of the conduit to the other as they rotate from the inlet to the outlet, said blades being in contact with the fluid in the conduit through substantially 360 degrees, whereby the blades are simultaneously exposed to all fluid velocities within the conduit, and means for measuring the velocity of said rotor.

7. The structure of claim 6 further characterized in that said blades form an angle other than 90 degrees with the plane of the rotor.

8. The structure of claim 6 further characterized in that said blades form an angle greater than 90 degrees with the path of fluid flow.

9. A fluid flow meter with a generally constant cross section helical conduit extending through approximately 360 degrees, said conduit having an inlet end and an outlet end, a circumferential slot in said conduit coaxial with and moving in a plane perpendicular to the helix axis, said rotor extending through said circumferential slot and having a plurality of blades adjacent its periphery which are enclosed by and move entirely within said conduit, said blades having a cross sectional area substantially smaller than the cross sectional area of the conduit and forming an angle greater than 90 degrees with the path of fluid flow, portions of said conduit, adjacent the inlet and outlet, being joined together and overlapping, with each of said joined portions having aligned openings for the pasage of said blades, from one joined portion to the other, said aligned openings being generally the size and shape of said blades, said rotor being driven in response to movement of fluid through said conduit, said rotor blades entering the conduit adjacent the inlet and along one side of the conduit and gradually moving toward the opposite side of the conduit as they approach the outlet, said blades being in contact with the fluid in the conduit through substantially 360 degrees, and means for measuring the velocity of said rotor.

10. The structure of claim 9 further characterized by a circumferential groove in said conduit, said rotor having an outer peripheral portion movable within said groove.

11. A fluid flow meter including a housing, said housing having a helical fluid conduit, a turbine rotor freely rotatable in said housing, said rotor having a plurality of blades about its periphery positioned within said fluid conduit, said conduit forming a passage for movement of said blades and having an inlet on one side of said rotor and an outlet on the opposite side, said conduit having a generally constant radius, a tunnel between the inlet and outlet ends of said conduit for the passage of said rotor blades, said tunnel being generally the size and shape of said blades, said rotor being driven in response to movement of fluid through said conduit, and means for measuring the velocity of said rotor.

References Cited by the Examiner
UNITED STATES PATENTS

| Re. 16,074 | 5/25 | Wahle | 103—96 |
|---|---|---|---|
| 1,909,756 | 5/33 | Claypool | 103—96 |

FOREIGN PATENTS

| 280,749 | 11/27 | Great Britain. |
|---|---|---|

RICHARD C. QUEISSER, *Primary Examiner.*
JOSEPH P. STRIZAK, *Examiner.*